US010380164B2

(12) United States Patent
Raichelgauz et al.

(10) Patent No.: US 10,380,164 B2
(45) Date of Patent: Aug. 13, 2019

(54) SYSTEM AND METHOD FOR USING ON-IMAGE GESTURES AND MULTIMEDIA CONTENT ELEMENTS AS SEARCH QUERIES

(71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

( * ) Notice: Subject to any disclaimer, the term of this patent is extended or adjusted under 35 U.S.C. 154(b) by 0 days.

(21) Appl. No.: 14/203,047

(22) Filed: Mar. 10, 2014

(65) Prior Publication Data

US 2014/0195513 A1    Jul. 10, 2014

Related U.S. Application Data

(63) Continuation-in-part of application No. 13/773,112, filed on Mar. 11, 2013, which is a
(Continued)

(30) Foreign Application Priority Data

Oct. 26, 2005 (IL) .......................... 171577
Jan. 29, 2006 (IL) .......................... 173409
Aug. 21, 2007 (IL) .......................... 185414

(51) Int. Cl.
*G06F 16/43* (2019.01)
*G06N 3/08* (2006.01)
(Continued)

(52) U.S. Cl.
CPC ............ *G06F 16/43* (2019.01); *G06F 16/951* (2019.01); *G06N 3/08* (2013.01); *G06N 20/00* (2019.01);
(Continued)

(58) Field of Classification Search
CPC ............ G06N 20/00; G06N 3/02; G06F 17/30
See application file for complete search history.

(56) References Cited

U.S. PATENT DOCUMENTS 4,733,353 A    3/1988 Jaswa
4,932,645 A    6/1990 Schorey et al.
(Continued)

FOREIGN PATENT DOCUMENTS

WO    WO 02/31764    4/2002
WO    2003005242 A1    1/2003
(Continued)

OTHER PUBLICATIONS

Semizarov et al. "Specificity of Short Interfering RNA Determined through Gene Expression Signatures", PNAS, 2003, pp. 6347-6352.
(Continued)

*Primary Examiner* — Eric Nilsson (57) ABSTRACT

A method and system for searching a plurality of information sources using a multimedia content element are provided. The method comprises receiving an input search query including the multimedia content element and at least one on-image gesture detected thereon; generating at least one signature for the multimedia content element; analyzing the at least one on-image gesture to determine at least one portion of the multimedia content element in which a user is interested; generating at least one signature for each of the at least one portion of the multimedia content element; generating a textual search query using the at least the one generated signature; searching the plurality of information sources using the generated textual search query; and causing the display of search results retrieved from the plurality of information sources on a user device.

29 Claims, 6 Drawing Sheets

Related U.S. Application Data continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/773,112 is a continuation-in-part of application No. 13/682,132, filed on Nov. 20, 2012, now Pat. No. 8,990,125, which is a continuation of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/773,112 is a continuation-in-part of application No. 12/084,150, filed as application No. PCT/IL2006/001235 on Apr. 7, 2009, now Pat. No. 8,655,801.

(60) Provisional application No. 61/775,958, filed on Mar. 11, 2013.

(51) Int. Cl.
  *G06N 20/00* (2019.01)
  *H04H 20/10* (2008.01)
  *H04H 60/37* (2008.01)
  *H04H 60/56* (2008.01)
  *H04H 60/66* (2008.01)
  *H04N 7/173* (2011.01)
  *H04N 21/258* (2011.01)
  *H04N 21/2668* (2011.01)
  *H04N 21/466* (2011.01)
  *H04N 21/81* (2011.01)
  *H04H 20/38* (2008.01)
  *H04H 60/33* (2008.01)
  *G06F 16/951* (2019.01)

(52) U.S. Cl.
  CPC .......... *H04H 20/103* (2013.01); *H04H 20/38* (2013.01); *H04H 60/33* (2013.01); *H04H 60/37* (2013.01); *H04H 60/56* (2013.01); *H04H 60/66* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | | |
|---|---|---|---|
| 4,972,363 | A | 11/1990 | Nguyen et al. |
| 5,147,636 | A | 9/1992 | Goodman et al. |
| 5,307,451 | A | 4/1994 | Clark |
| 5,568,181 | A | 10/1996 | Greenwood et al. |
| 5,745,678 | A | 4/1998 | Herzberg et al. |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,978,754 | A | 11/1999 | Kumano |
| 5,991,306 | A | 11/1999 | Burns et al. |
| 6,052,481 | A | 4/2000 | Grajski et al. |
| 6,076,088 | A | 6/2000 | Paik et al. |
| 6,122,628 | A | 9/2000 | Castelli et al. |
| 6,137,911 | A | 10/2000 | Zhilyaev |
| 6,144,767 | A | 11/2000 | Bottou et al. |
| 6,243,375 | B1 | 6/2001 | Speicher |
| 6,243,713 | B1 | 6/2001 | Nelson et al. |
| 6,275,599 | B1 | 8/2001 | Adler et al. |
| 6,329,986 | B1 | 12/2001 | Cheng |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,507,672 | B1 | 1/2003 | Watkins et al. |
| 6,523,046 | B2 | 2/2003 | Liu et al. |
| 6,524,861 | B1 | 2/2003 | Anderson |
| 6,550,018 | B1 | 4/2003 | Abonamah et al. |
| 6,594,699 | B1 | 7/2003 | Sahai et al. |
| 6,611,628 | B1 | 8/2003 | Sekiguchi et al. |
| 6,618,711 | B1 | 9/2003 | Ananth |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,704,725 | B1 | 3/2004 | Lee |
| 6,732,149 | B1 | 5/2004 | Kephart |
| 6,751,363 | B1 | 6/2004 | Natsev et al. |
| 6,751,613 | B1 | 6/2004 | Lee et al. |
| 6,754,435 | B2 | 6/2004 | Kim |
| 6,763,069 | B1 | 7/2004 | Divakaran et al. |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,819,797 | B1 | 11/2004 | Smith et al. |
| 6,845,374 | B1 | 1/2005 | Oliver et al. |
| 6,901,207 | B1 | 5/2005 | Watkins |
| 6,938,025 | B1 | 8/2005 | Lulich et al. |
| 7,006,689 | B2 * | 2/2006 | Kasutani ............ G06F 17/3025 375/240.2 |
| 7,013,051 | B2 | 3/2006 | Sekiguchi et al. |
| 7,020,654 | B1 | 3/2006 | Najmi |
| 7,043,473 | B1 | 5/2006 | Rassool et al. |
| 7,158,681 | B2 | 1/2007 | Persiantsev |
| 7,199,798 | B1 | 4/2007 | Echigo et al. |
| 7,215,828 | B2 | 5/2007 | Luo |
| 7,260,564 | B1 | 8/2007 | Lynn et al. |
| 7,277,928 | B2 | 10/2007 | Lennon |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,433,895 | B2 | 10/2008 | Li et al. |
| 7,464,086 | B2 | 12/2008 | Black et al. |
| 7,526,607 | B1 | 4/2009 | Singh et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,694,318 | B2 | 4/2010 | Eldering et al. |
| 7,836,054 | B2 | 11/2010 | Kawai et al. |
| 7,920,894 | B2 | 4/2011 | Wyler |
| 7,921,107 | B2 | 4/2011 | Chang et al. |
| 7,933,407 | B2 | 4/2011 | Keidar et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,023,739 | B2 | 9/2011 | Hohimer et al. |
| 8,036,893 | B2 | 10/2011 | Reich |
| 8,098,934 | B2 * | 1/2012 | Vincent ............... G06K 9/3258 382/177 |
| 8,112,376 | B2 | 2/2012 | Raichelgauz et al. |
| 8,266,185 | B2 | 9/2012 | Raichelgauz et al. |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,345,982 | B2 | 1/2013 | Gokturk et al. |
| 8,457,827 | B1 | 6/2013 | Ferguson et al. |
| 8,495,489 | B1 | 7/2013 | Everingham |
| 8,548,828 | B1 | 10/2013 | Longmire |
| 8,655,801 | B2 | 2/2014 | Raichelgauz et al. |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,799,195 | B2 | 8/2014 | Raichelgauz et al. |
| 8,799,196 | B2 | 8/2014 | Raichelquaz et al. |

(56) References Cited

U.S. PATENT DOCUMENTS

| | | |
|---|---|---|
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,606,992 B2 | 3/2017 | Geisner et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0019881 A1 | 2/2002 | Bokhari et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1* | 7/2006 | Kim .................. G06K 9/00664 396/236 |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0168413 A1 | 7/2007 | Barletta et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1* | 10/2008 | Kimura ................ G11B 27/005 386/349 |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |

(56) References Cited

U.S. PATENT DOCUMENTS

| | | |
|---|---|---|
| 2009/0024641 A1 | 1/2009 | Quigley et al. |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125544 A1* | 5/2009 | Brindley ........... G06F 17/30038 |
| 2009/0148045 A1* | 6/2009 | Lee ..................... G06T 11/00 |
| | | 382/190 |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0259687 A1 | 10/2009 | Mai et al. |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2010/0325581 A1 | 12/2010 | Finkelstein et al. |
| 2011/0052063 A1 | 3/2011 | McAuley et al. |
| 2011/0055585 A1 | 3/2011 | Lee |
| 2011/0145068 A1* | 6/2011 | King ..................... G06F 17/211 |
| | | 705/14.55 |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0197857 A1* | 8/2012 | Huang ................... G06F 3/0488 |
| | | 707/706 |
| 2012/0227074 A1 | 9/2012 | Hill et al. |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Amgren et al. |
| 2013/0311924 A1 | 11/2013 | Denker et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2015/0154189 A1 | 6/2015 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |
| 2016/0239566 A1 | 8/2016 | Raichelgauz et al. |

FOREIGN PATENT DOCUMENTS

| | | | |
|---|---|---|---|
| WO | | 2003067467 A1 | 8/2003 |
| WO | | 2004019527 A1 | 3/2004 |
| WO | | 2005027457 A1 | 3/2005 |
| WO | WO 2007/049282 | | 5/2007 |
| WO | | 2014137337 A1 | 9/2014 |
| WO | | 2016040376 A1 | 3/2016 |

OTHER PUBLICATIONS

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Foote, Jonathan, et al. "Content-Based Retrieval of Music and Audio", 1997 Institute of Systems Science, University National of Singapore, Singapore (Abstract).

Garcia, "Solving the Weighted Region Least Cost Path Problem Using Transputers", Naval Postgraduate School, Monterey, California, Dec. 1989.

Guo et al, "AdOn: An Intelligent Overlay Video Advertising System", SIGIR, Boston, Massachusetts, Jul. 19-23, 2009.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Ribert et al. "An Incremental Hierarchical Clustering", Visicon Interface 1999, pp. 586-591.

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

(56) References Cited

OTHER PUBLICATIONS

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted 11104; published Jul. 2005.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.

Jaeger, H: "The "echo state" approach to analysing and training recurrent neural networks", GMD Report, No. 148, 2001, pp. 1-43, XP002466251 German National Research Center for Information Technology.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Natschlager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Report for the related International Patent Application PCT/IL2006/001235; dated Nov. 2, 2008.

International Search Authority: "Written Opinion of the International Searching Authority" (PCT Rule 43bis.1) including International Search Report for the related International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; dated Jul. 28, 2009.

IPO Examination Report under Section 18(3) for corresponding UK application No: GB1001219.3, dated Sep. 12, 2011.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publication.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and EXPO, 2007 IEEE International Conference on Year: 2007, pp. 1043-1046, DOI: 10.1109/ICME.2007.4284832 IEEE Conference Publications.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

Lin, et al., "Robust Digital Signature for Multimedia Authentication: A Summary", IEEE Circuits and Systems Magazine, 4th Quarter 2003, pp. 23-26.

Chuan-Yu Cho, et al., "Efficient Motion-Vector-Based Video Search Using Query by Clip", 2004, IEEE, Taiwan, pp. 1-4.

Gomes et al., "Audio Watermaking and Fingerprinting: For Which Applications?" University of Rene Descartes, Paris, France, 2003.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shih-Fu Chang, et al., "VideoQ: A Fully Automated Video Retrieval System Using Motion Sketches", 1998, IEEE, , New York, pp. 1-2.

Wei-Te Li et al., "Exploring Visual and Motion Saliency for Automatic Video Object Extraction", IEEE, vol. 22, No. 7, Jul. 2013, pp. 1-11.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Li, et al., "Matching Commercial Clips from TV Streams Using a Unique, Robust and Compact Signature," Proceeding of the Digital Imaging Computing: Techniques and Applications, Feb. 2005, vol. 0-7695-2467, Australia.

May et al., "The Transputer", Springer-Verlag, Berlin Heidelberg, 1989, teaches multiprocessing system.

(56) References Cited

OTHER PUBLICATIONS

Nam, et al., "Audio Visual Content-Based Violent Scene Characterization", Department of Electrical and Computer Engineering, Minneapolis, MN, 1998, pp. 353-357.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Brecheisen, et al., "Hierarchical Genre Classification for Large Music Collections", ICME 2006, pp. 1385-1388.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
The International Search Report and the Written Opinion for PCT/US2016/054634 dated Mar. 16, 2017, ISA/RU, Moscow, RU.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Hua, et al., "Robust Video Signature Based on Ordinal Measure", Image Processing, 2004. 2004 International Conference on Image Processing (ICIP), vol. 1, IEEE, pp. 685-688, 2004.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University ADVENT technical report, 2007, pp. 222-2006-8.
Zou, et al., "A Content-Based Image Authentication System with Lossless Data Hiding", ICME 2003, pp. 213-216.

\* cited by examiner

SYSTEM AND METHOD FOR USING ON-IMAGE GESTURES AND MULTIMEDIA CONTENT ELEMENTS AS SEARCH QUERIES

CROSS-REFERENCE TO RELATED APPLICATIONS

This application claims the benefit of U.S. Provisional Application No. 61/775,958 filed on Mar. 11, 2013, the contents of which are hereby incorporated by reference. This application is a continuation-in-part (CIP) of U.S. patent application Ser. No. 13/773,112 filed on Feb. 21, 2013, now pending, which is a CIP of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 13/682,132 filed Nov. 20, 2012, which is a continuation application of U.S. patent application Ser. No. 12/195,863, filed Aug. 21, 2008, now U.S. Pat. No. 8,326,775. The Ser. No. 12/195,863 application claims priority under 35 USC 119 from Israeli Application No. 185414, filed on Aug. 21, 2007, and is also a continuation-in-part of the below-referenced U.S. patent application Ser. No. 12/084,150; and, (c) U.S. patent application Ser. No. 12/084,150 having a 371 filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content, and more specifically to search information resources using on-image gestures over a multimedia content.

BACKGROUND

Web search engines are used for searching for information over the World Wide Web (WWW) and can be accessed through a web browser. Web-pages typically contain text and multimedia content elements that are intended for display on a user's display device. Multimedia content elements are generally displayed using portions of code written in, for example, hyper-text mark-up language (HTML) or the JavaScript® programming language that is inserted into, or otherwise called up by documents also written in HTML and which are sent to a user node for display.

A web search query refers to a query that a user enters into a web search engine in order to receive search results. A web search query typically includes one or more key words. Different people would typically query a search engine using different search queries even when they look for the same content. Consequently, the task of finding relevant and appropriate search results respective of a search query is complex due to, for example, language differences, or interpretation of the requested content. Furthermore, often is the case where a user seeks information, but cannot accurately express the objective of the search when using a textual search query.

A gesture is a form of non-verbal communication or interaction in which visible bodily actions communicate particular messages, either in place of, or in conjunction with, speech. An on-image gesture is a form of a gesture of a user's interaction with a multimedia content element including, but not limited to, web pages. The on-image gesture or combination of gestures may include, but is not limited to: one or more touch gestures, one or more scrolls over the at least a portion of the multimedia content element, one or more clicks over the at least a portion of the multimedia content, one or more responses to the at least a portion of the multimedia content, a combination thereof, a portion thereof, and so on. The touch gestures may be related to computing devices with a touch screen display and such gestures include, but are not limited to, tapping on a content element, resizing a content element, swiping over a content element, changing the display orientation, and so on. An on-image gesture as being indicative of the user's interaction with the displayed content may be utilized to clarify the user's intention with respect to a search query.

It would be therefore advantageous to provide a solution for providing search results by using a multimedia content element and an on-image gesture detected thereon as an input web search query.

SUMMARY

Certain embodiments include herein a method and system for searching a plurality of information sources using a multimedia content element. The method comprises receiving an input search query including the multimedia content element and at least one on-image gesture detected thereon; generating at least one signature for the multimedia content element; analyzing the at least one on-image gesture to determine at least one portion of the multimedia content element in which a user is interested; generating at least one signature for each of the at least one portion of the multimedia content element; generating a textual search query using the at least the one generated signature; searching the plurality of information sources using the generated textual search query; and causing the display of search results retrieved from the plurality of information sources on a user device.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are merely examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow providing appropriate search results for a search query including a multimedia content element and on-image gesture detected thereon. In an embodiment, discussed in greater detail below, the received multimedia content element and on-image gesture are analyzed and based on the analysis, a textual search query is generated. Such query can be fed to a search engine or returned to the user submitting the query.

Figure 1:
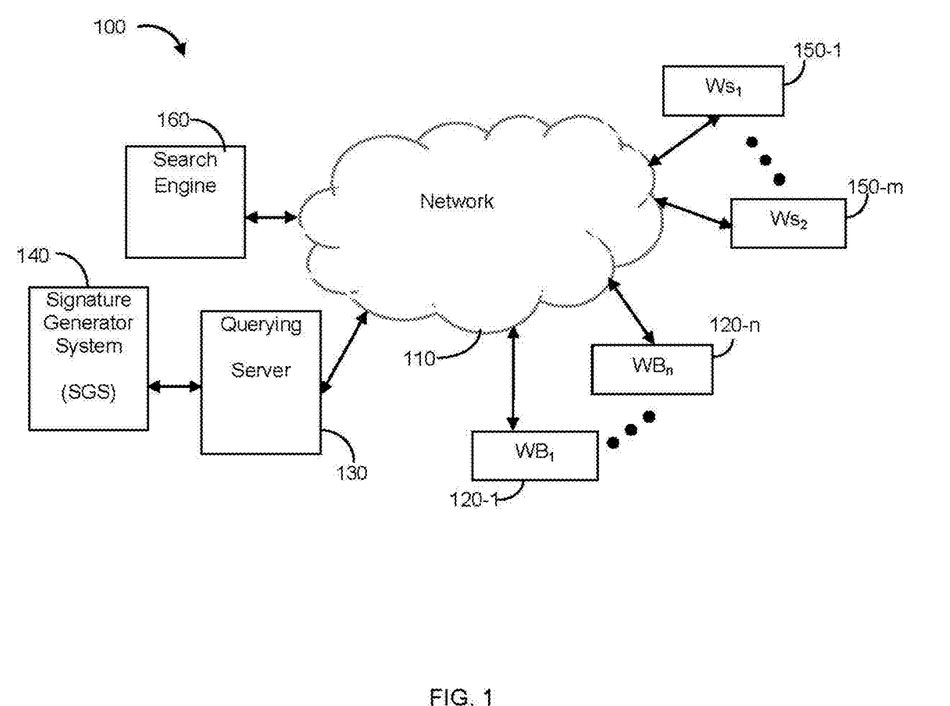
FIG. 1 is a schematic block diagram of a network system utilized to describe the various embodiments disclosed herein.

FIG. 1 shows an exemplary and non-limiting schematic diagram of a system 100 utilized to describe the various disclosed embodiments. As illustrated in FIG. 1, a network 110 is used for the communication between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are client applications, such as web browsers (WB) 120-1 through 120-n (collectively referred to hereinafter as web browsers 120 or individually as a web browser 120). A web browser 120 is executed over a computing device which may be, for example, a personal computer (PC), a personal digital assistant (PDA), a mobile phone, a tablet computer, a wearable computing device, and the like, which include a user interface (not shown) that is configured to receive or capture on-image gestures from a user. The computing device is further configured to provide at least multimedia content elements to servers connected to the network 110. A user interface for receiving or capturing on-image gestures may include, but is not limited to, a touch screen, a mouse, a mouse pad, a stylus pen, and the like. In an embodiment, each of the web browsers 120 may be implemented as an independent application, a plug-in application, a script, a mobile application (app) installed and executed in the computing device and/or the browser 120.

The multimedia content elements provided by a computing device can be locally saved in the computing device or can be captured by the device. For example, the multimedia content element may be an image captured by a camera installed in the device, a video clip saved in the device, and so on. A multimedia content element processed according the disclosed embodiments can be embedded in a web-page or downloaded to a data repository connected to the web. A multimedia content element may be, for example, an image, a graphic, a video stream, a video clip, an audio stream, an audio clip, a video frame, a photograph, an image of signals (e.g., spectrograms, phasograms, scalograms, etc.), and/or combinations thereof and portions thereof.

The system 100 also includes a plurality of information sources 150-1 through 150-m (collectively referred to hereinafter as information sources 150 or individually as an information source 150) being connected to the network 110. Each of the information sources 150 may be, for example, a web server, an application server, a data repository, a database, and the like. Also connected to the network 110 is a search engine 160 that is configured to search the one or more information sources 150 based on an input textual search query generated by the querying server 130 as disclosed in detail above. The search results may be provided directly to a web browser 120 or to a querying server 130.

The various embodiments disclosed herein are realized using the querying server 130 and a signature generator system (SGS) 140. The querying sever 130 generates at least a textual search query respective of a multimedia content element and an on-image gesture detected thereon provided by a user's computing device by means of a web browser 120. The generated textual search query is input to the search engine 160, which searches the information resources 150 as noted above.

An on-image gesture is in a form of a gesture of a user's interaction with a multimedia content element including, but not limited to, web pages. The on-image gesture or combination of gestures may include, but is not limited to: touch gestures, scrolls over a portion of the multimedia content element, mouse clicks over a portion of the multimedia content element, one more responses to the at least a portion of the multimedia content element, a combination thereof, and so on. The on-image gesture may include one or more touch gestures related to computing devices with a touch screen display and such gestures include, but are not limited to, tapping on a content element or portion thereof, resizing a content element of portion thereof, swiping over a content element or portion thereof, changing the display orientation, or a combination thereof, and the like.

The on-image gesture may be captured by the browser 120 and may be sent to the server 130 as a set of mouse coordinates, zoom coordinates (or other data representation), swipe/pan coordinates (or other data representation), and the like. In one embodiment, the on-image gesture is detected by monitoring events with respect to the user's interaction with the web-page. Such events include, but are not limited to, a scroll, resize, load, unload, click, key-down, key-press, key-up, paste, mouse-leave, mouse-enter, mouse-move, mouse-down, mouse-up, focus, orientation-change, touch-move, and the like.

The server 130 is configured to analyze the data received with respect to the on-image gesture. The analysis includes determining the type of the gesture based on the type of the event (e.g., swipe/pan or zoom), and the gesture pattern with respect to the content element based, in part, on the received coordinates. As a non-limiting example, if a multimedia content element is an image featuring a man and a boat, and the on-image gesture is determined to be a zoom-in, the zoom's coordinates are analyzed to check if the user zooms in on either the boat or the man. It should be noted that this would result in an event of expanding a part of a screen that demonstrates an interest in the particular portion of the image that is expanded.

The textual search query is generated respective of the analysis of the on-image gesture and signatures generated for the multimedia content element or portion thereof. The signatures are generated by the SGS 140 as discussed below. In an embodiment, the on-image gesture is utilized to determine at least one portion of the received multimedia content element that is of particular interest to the user. As in the above example, if an image features a man and a boat, and the user zooms in on the boat (an event of expanding a part of a screen that demonstrates an interest in the particular portion of the image that is expanded), the boat is determined to be the portion of the multimedia content element that is of particular interest to the user. In an embodiment, a signature can be also generated for the portion that is of particular interest to the user. In one embodiment, signatures generated to multimedia content elements and/or its portion(s) of particular interest are utilized to query a database of concepts to detect at least one concept that matches the signatures. The metadata of the at least one matching concept can be utilized as the textual search query.

A concept is a collection of signatures representing elements of the unstructured data and metadata describing the concept. As a non-limiting example, a 'SUPERMAN® concept' is a signature reduced cluster of signatures describing elements (such as multimedia content elements) related to, e.g., a SUPERMAN® cartoon: a set of metadata representing providing textual representation of the SUPERMAN® concept. Techniques for generating concepts and concept structures are also described in U.S. Pat. No. 8,266,185 to Raichelgauz, et al., which is assigned to common assignee, and is hereby incorporated by reference for all that it contains.

An exemplary database of concepts is disclosed in a co-pending U.S. patent application Ser. No. 13/766,463, filed Feb. 13, 2013, entitled "A SYSTEM AND METHODS FOR GENERATION OF A CONCEPT BASED DATABASE", assigned to common assignee, and is hereby incorporated by reference for all the useful information it contains.

In one embodiment, the search results generated by the search engine 160 respective of the generated textual search query are provided to the querying server 130 which filters the results based in part on the signature generated for the input multimedia content element. The filtered results are sent to the web browser for display thereon. In another embodiment, the textual search query generated by querying server 130 can be returned to the web browser 120 to initiate a search by a user of the browser 120. In this embodiment, the textual search query may be embedded with a hypertext reference to a search engine. That is, by clicking on the returned query, search results from the referenced search engine are retrieved and displayed on the web browser 120. In another embodiment, the querying server 130 is configured to directly query the information sources 150 using a textual search query generated respective of an input on-image gesture over a multimedia content element.

As noted above, the SGS 140 is configured to generate a signature respective of the multimedia content elements fed by the querying server 130. In an embodiment, the SGS 140 is a component integrated in the server 130. The process for generating the signatures is explained in more details herein below with respect to FIGS. 4 and 5. Each of the querying server 130 and the SGS 140 is typically comprised of a processing unit, such as a processor (not shown) that is coupled to a memory. The memory contains instructions that can be executed by the processing unit. The querying server 130 also includes a network interface (not shown) to the network 110.

A user can provide an input multimedia content element to perform the search through a web site that enables uploading of a multimedia content element to the querying server 130. The uploaded multimedia element may be a file or a link to a location of the multimedia element. The uploaded multimedia element may also include a request to provide search results or a query respective of the uploaded multimedia element. In another embodiment, the multimedia element can be generated and sent by a script executed in the web page visited by the web browser 120, or an add-on (not shown) installed in the web browser.

The querying server 130 is configured to analyze the on-image gesture and the multimedia content element or one or more portions thereof, to detect one or more appropriate search results respectively. It should be noted that the querying server 130 may analyze all or a sub-set of the multimedia elements. The SGS 140 is configured to generate at least one signature for the multimedia element or each portion thereof, provided by the querying server 130. The generated signature(s) may be robust to noise and distortions as discussed below. Then, using the signature(s) provided by the SGS 140, the querying server 130 generates a textual search query.

In one embodiment, in order to generate a textual search query, the signature provided by the SGS 140 and the analysis of the on-image gesture are checked against a query database (not shown) that maintains mappings between signatures, gestures and textual queries. That is, the query database maintains for each signature and gesture a matching textual search query. It should be noted that different signatures can be mapped to the same query. For example, a picture of a car make BMW and model X3 can be taken from different angles, or the same type of car can be presented in different colors. In the query database accessed by the querying server 130, signatures of images of a car make BMW and model X3 are mapped to one text query, for example, "BMW X3 model". If the server 130 receives a signature that is not found in the query database, a similar signature in the query database is then detected. A similar signature can be detected based, in part, on the context of the multimedia element and the generated signature. An exemplary technique for determining a context of a multimedia element based on signatures is described in detail in U.S. patent application Ser. No. 13/770,603, filed Feb. 19, 2013, which is assigned to common assignee, which is hereby incorporated by reference for all the useful information it contains.

In another embodiment, the querying server 130 is configured to optimize the generated query using information related, for example, to the user's behavior, demographic information, intent, and so on. For example, using the additional information, the server 130 may generate a textual search query "BMW X3 model car dealerships in the Bay Area." The text of "car dealerships in the Bay Area" is provided in response to the analyzed user's behavior (the user is currently shopping for new cars) and on the user's location (Bay Area) derived from the demographic information. In yet another embodiment, the signatures generated by the SGS 140 for more than one multimedia element or portions of an element are clustered. The clustered signatures can be utilized to create a textual search query or to search the information resources 150.

It should be appreciated that using signatures to generate the textual search queries allows the retrieval and reorganization of accurate results including, but not limited to, multimedia content elements in comparison to utilization of metadata. The signatures generated by the SGS 140 for the multimedia elements allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car, enables accurate recognition of the model of the car from any angle from which the picture was taken.

In one embodiment, the generated signatures can be utilized to search one or more of the information resources for a matching search result. In a particular embodiment the retrieval of search results by means of the signatures generated by the SGS 140 may be performed from data sources that index searchable content including, but not limited to, multimedia content using signatures and concepts. A context is determined as the correlation between a plurality of concepts. An example for such indexing techniques using signatures is disclosed in a co-pending U.S. patent application Ser. No. 13/766,463, referenced above.

The querying server 130 can also enable the selection of a portion of a multimedia element as a search query. For instance, in order to provide appropriate search results for sunglasses of a specific brand, which is shown within an image of several people walking on a sea shore, the user may select only the sunglasses in order to search for additional relevant products. The selection of one or more portions is enabled on a multimedia element provided as an initial query or a multimedia element returned in response to the initial query. The selection of a portion of the multimedia element may be performed using, for example, a user's gesture or a text query.

Figure 2:
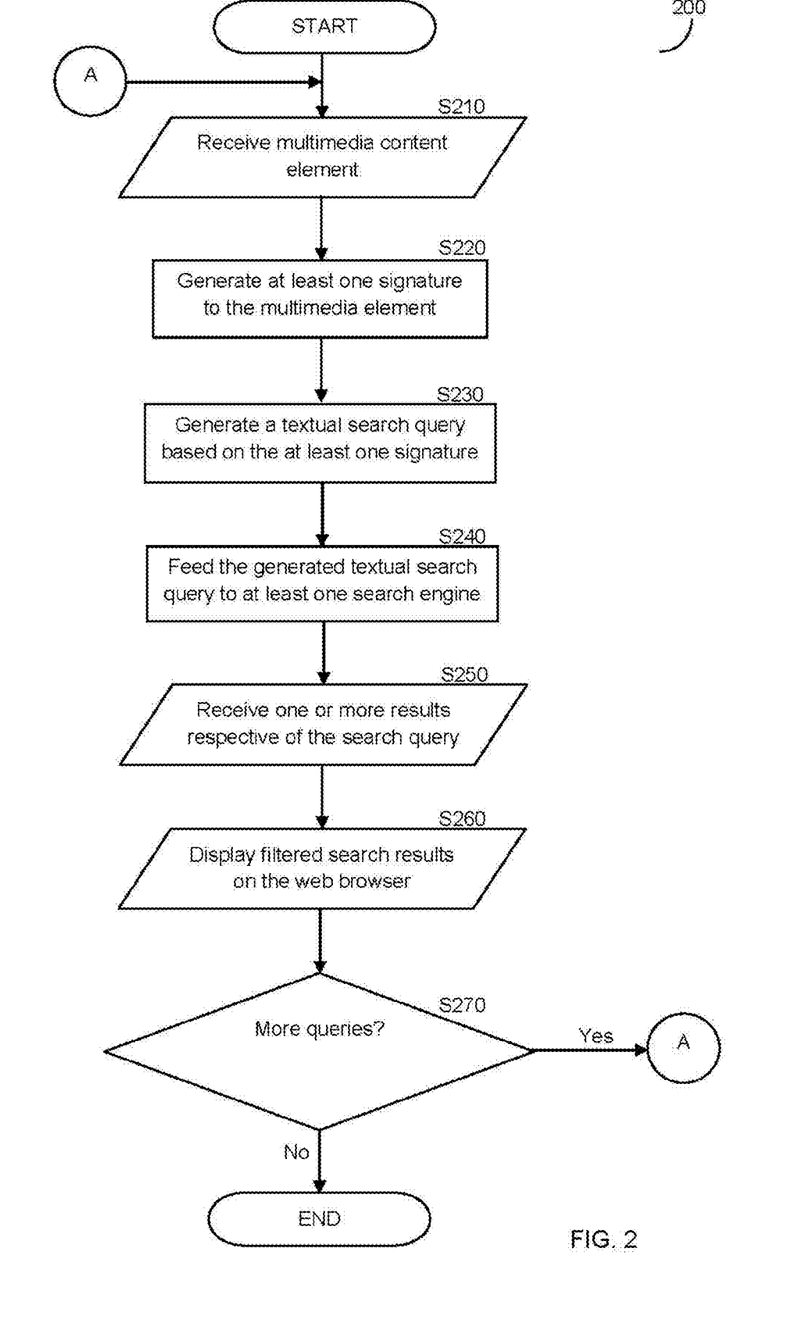
FIG. 2 is a flowchart describing a process for generating a textual search query and for searching information resources respective of input multimedia content elements.

FIG. 2 depicts an exemplary and non-limiting flowchart 200 describing a process for generating a textual search query and performing a search respective of a multimedia element. In S210, a multimedia element or one or more portions thereof is received. The multimedia element may be sent together with a search request from a web-browser, for example, the web browser 120-1.

According to one embodiment, the querying server 130 is further configured to receive additional parameters to enhance the search operation. The additional parameters are received, for example, through an overlay object created by the querying server 130 over the multimedia element. The overlay may include a search box or other interactive object. The additional parameters, provided as part of the search request, may be, for example, a specific portion within the multimedia element or other conditions respective thereto. The request can be received from a script running on the uploaded web-page, or an agent (e.g., an add-on) installed in the web-browser 120-1.

In S220, at least one signature respective of the input multimedia content element is generated. The signature for the multimedia element is generated by the SGS 140 as described below. S220 can also include identification of the context of the multimedia element respective of the generated signature. As noted above, the signature may be robust to noise and distortions. A signature can be generated for each portion identified in the input multimedia element. The input multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof. In an embodiment, S220 includes receiving at least one signature generated by the signature generator.

In S230, a textual search query is generated based on the least one signature. The textual search query can also be generated based on the context of the multimedia content element. As discussed in detail earlier, this can be performed by searching the query database for a query that maps to the generated signature or a similar signature. For example, the search of the query database may be based on the context of the multimedia content element. In one embodiment, the matching query found in the query database can be optimized using any one of the behavior and demographic information related to a user providing the input element.

In S240, the generated textual search query is fed to at least one search engine 160 to search for information respective of the search query. Alternatively, as discussed above, the textual search query may be returned to the web browser together with an embedded link to a search engine. In another embodiment, S240 includes searching the one or more information sources 150 using the signature(s). Such a search is performed by the querying server 130 which queries sources 150 using the generated signature(s). Alternatively or collectively, the search may be performed by the querying sever 130 using the generated textual search. It should be noted that any of the techniques described in S240 can be utilized to search for appropriate results. That is, the search may be initiated by the search engine 160, the querying server 130 using signatures and/or textual queries, or by both the engine 160 and server 130.

In S250, the search results are received at the querying server 130 to filter results that would best serve the user providing the input multimedia content element. The filtering of results may be performed based on the user's intent that can be derived by the querying server 130 using, for example, the user's experience or similar users' experiences, received by an add-on (not shown) installed in the web-browser. The add-on is configured to track the users' activity.

Figure 4:
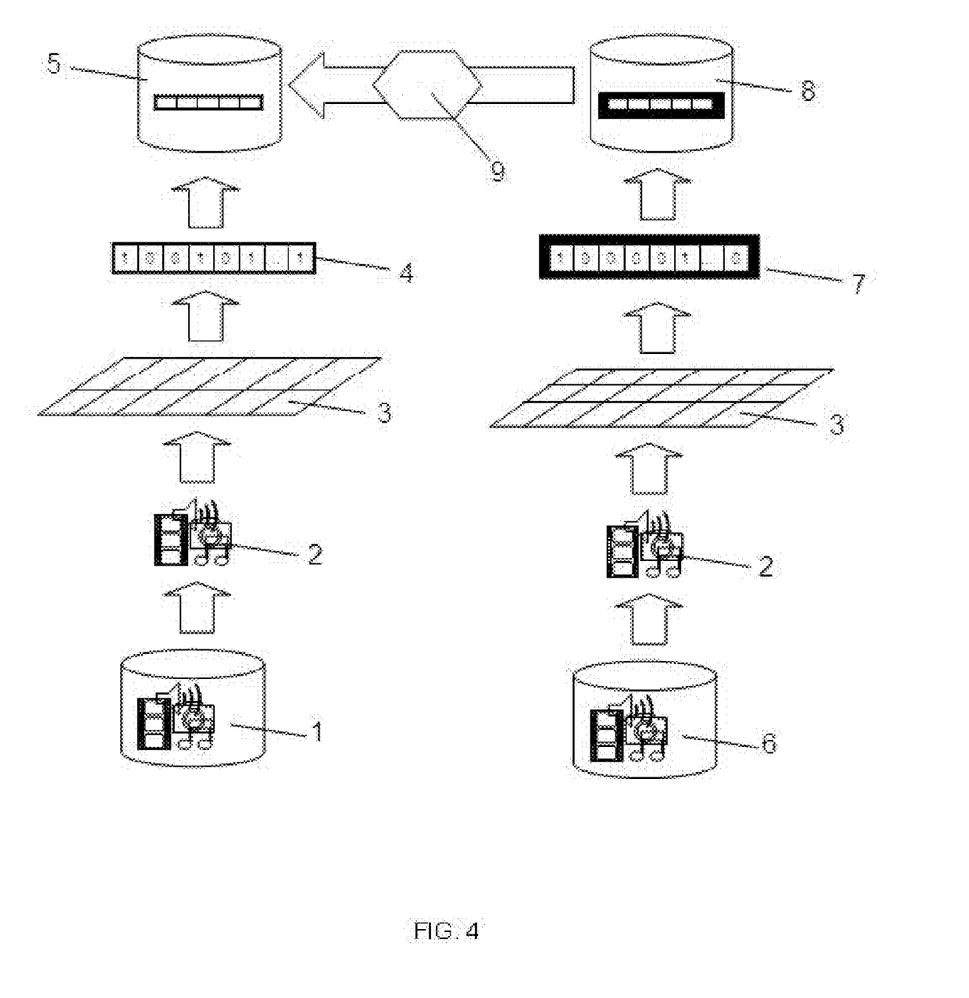
FIG. 4 is a diagram depicting the basic flow of information in a signature generator system.

Alternatively or collectively, the search results may be filtered by matching a multimedia element retrieved through the search of the textual search query to the input multimedia element. Such matching is performed by generating signature(s) for the retrieved multimedia element and matching such signature(s) to a signature of the input multimedia element. An exemplary matching process that can be utilized for this purpose is illustrated in FIG. 4.

The filtered search results can serve to detect web advertisements that would be of interest for the user. Matching web advertisements can be detected as described in the co-pending U.S. patent application Ser. No. 13/624,397 assigned to common assignee, which is hereby incorporated by reference for all the useful information it contains.

In S260, the filtered results are sent to the web browser (e.g. browser 120-1) for a display. In S270 it is checked whether an additional multimedia element is received as a search query, and if so, execution continues with S210; otherwise, execution terminates.

Following is a non-limiting example for operation of the method described in FIG. 2. The querying server 130 receives an image of a man wearing a hat. The image is then analyzed and a plurality of signatures is generated respective thereto. In order to determine the user's exact intent, a search box is created over the image and an indicator that the user's intent relates to the hat shown in the image is received. Respective of the image signature and the user's intent, a textual search query is generated, for example, "Giant's championship 2012 hat". The search results using the generated query are generated and displayed. Such results may be, for example, one or more links to purchase the hat on eBay®, one or more additional images of hats, one or more images of the hat from different angles, one or more videos that contains video-shots of the hat, and so on.

Figure 3:
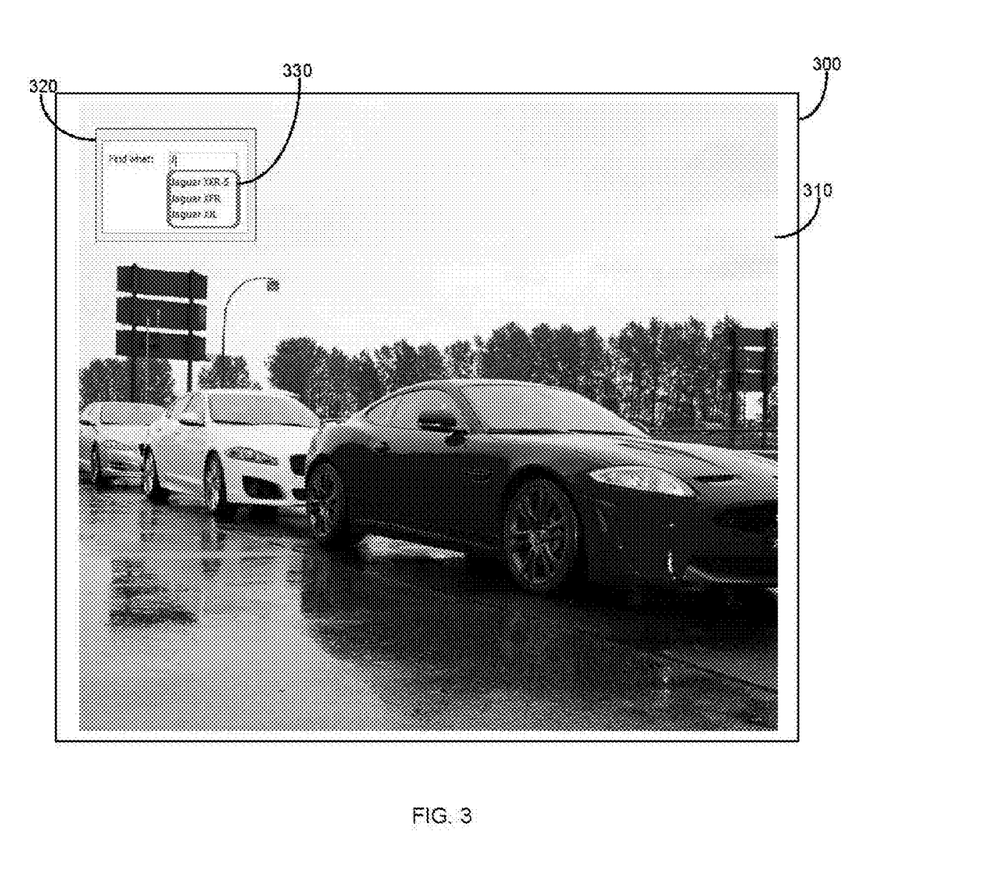
FIG. 3 is a screenshot of a web page displayed on a device illustrating the creation of an overlay object over an image that enables enhancement of the search.

Another example for the operation of the disclosed method is provided in FIG. 3, which depicts an exemplary and non-limiting screenshot of a web page 300 illustrating the creation of an overlay over an image received as a search query according to an embodiment. The web page 300 is displayed on a web browser of a client's device.

The querying server 130 receives an image 310 as a search query. A plurality of signatures is generated by the SGS 140 respective of the plurality of elements shown in the image. For example, a signature can be created for each car in the image 310. An overlay search box 320 is then created to enable the user to focus the search and enhance the search experience. In the overlay search box 310, the one or more textual search queries 330 as generated by the querying server 130 are displayed. The queries are respective of each portion of the image 310. For example, queries are related to the different car models shown in the image 310. Respective of the input received through the search box 320, a modified search can be initiated.

Figure 5:
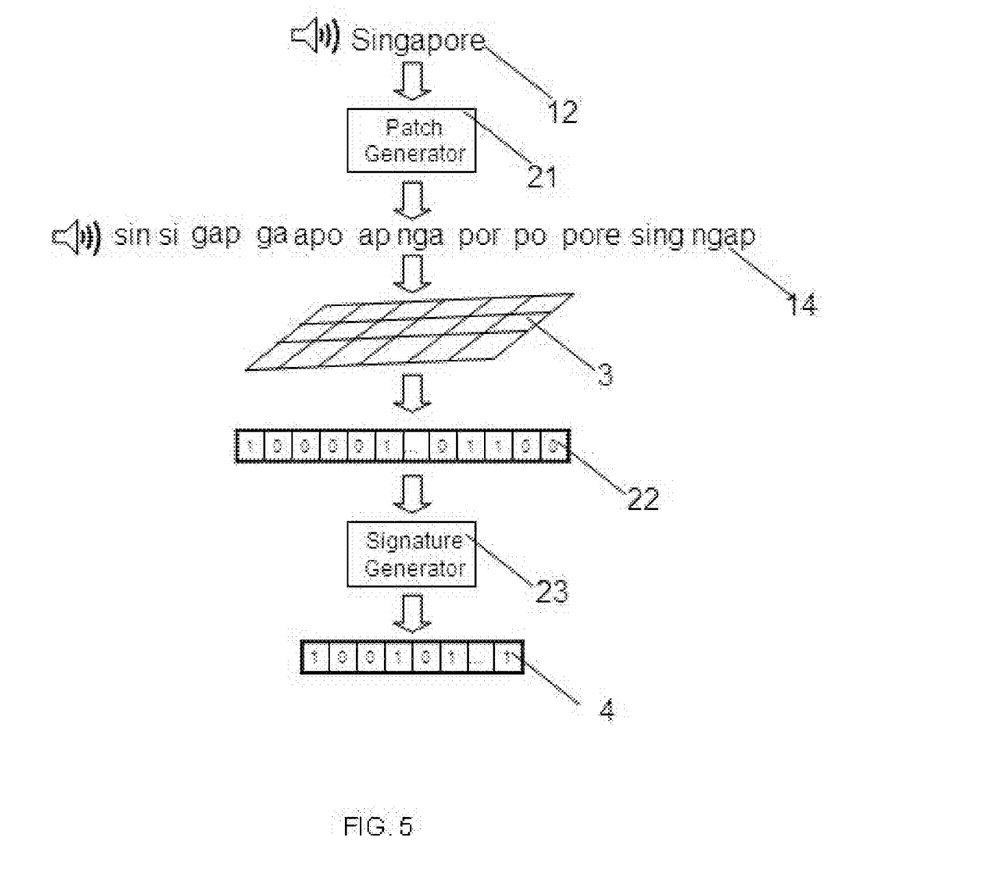
FIG. 5 is a diagram showing the flow of patches generation, response vector generation, and signature generation in a large-scale speech-to-text system.

FIGS. 4 and 5 illustrate the generation of signatures for the multimedia content elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 5. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the querying server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3, a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \theta(V_i - Thx)$$

where, $\theta$ is a Heaviside step function; $wi_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and $V_i$ is a Coupling Node Value.

The Threshold values $Th_X$ are set differently for Signature generation and for Robust Signature generation. For example, for a certain distribution of values (for the set of nodes), the thresholds for Signature ($Th_S$) and Robust Signature ($Th_{RS}$) are set apart, after optimization, according to at least one or more of the following criteria:

For: $V_i > Th_{RS}$ $$1 - p(V > Th_S) - 1 - (1-\varepsilon)^l \ll 1$$

i.e., given that l nodes (cores) constitute a Robust Signature of a certain image I, the probability that not all of these l nodes will belong to the Signature of a same, but noisy image, $\vec{\ }$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in U.S. Pat. No. 8,655,801 referenced above.

Figure 6:
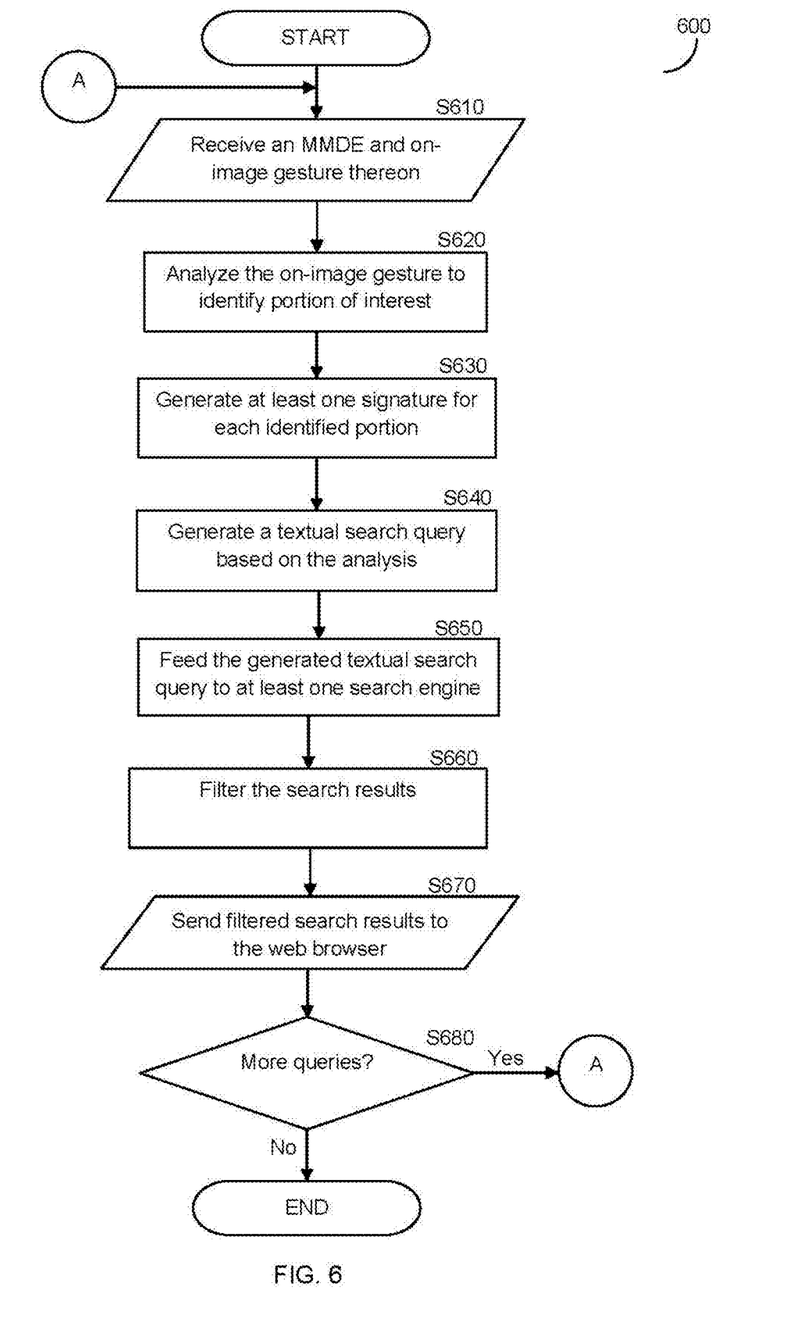
FIG. 6 is a flowchart describing a method for generating a textual search query for searching information resources respective of an analysis of an on-image gesture according to one embodiment.

FIG. 6 is an exemplary and non-limiting flowchart 600 describing a process for generating a textual search query and performing a search respective of an on-image gesture according to an embodiment.

In S610, a multimedia content element and an on-image gesture detected thereon are received as a web search query. As noted above, such an on-image gesture may be, for example, a touch gesture, a sketch gesture, a scrolls over at least a portion of the multimedia content element, a mouse click over a portion of the multimedia content element, one or more responses to a portion of the multimedia content element, and the like. A touch gesture may be related to computing devices with a touch screen display and such gestures include, but are not limited to, tapping on a content element, resizing a content element, swiping over a content element, changing the display orientation, and so on.

In an embodiment, the on-image gesture is received as a set of mouse coordinates, zoom coordinates (or other data representation), swipe/pan coordinates (or other data representation), and the like. It should be noted that an on-image gesture data set may represent a sequence of gestures. As an example, a click on the at least a portion of the multimedia content may be determined as a first gesture, and a double click on the at least a portion of the multimedia content may be determined as a different gesture. According to one embodiment, an illustration of the received gesture may be displayed as an overlay over the multimedia element as feedback to the user gesture. Optionally, S610 may also include receiving demographical information and/or location information related to the user submitting the query.

In S620, the received on-image gesture data is analyzed to determine at least one portion of the received multimedia content element that is of particular interest to the user. Exemplary techniques for realizing S620 are discussed above.

In S630, at least one signature is generated for each portion of the multimedia content element identified in S620. In addition, at least one signature may be generated for the received multimedia content element. The signatures for the multimedia content elements are generated as described in greater detail above.

In S640, a textual search query is generated based on the analysis of the on-image gesture and the generated signatures. In one embodiment, S640 includes querying a database of concepts to detect at least one concept that matches the signatures. The metadata of the matching concepts can be utilized as the textual search query. A matched concept is a concept in which its signature and the generated signatures overlap more than a predetermined threshold level, for example 60% of the signatures match. Such signatures may be considered as matching.

In another embodiment, S640 includes determining, using the generated signatures, a context for the multimedia content element and/or the portions of a particular interest to determine the textual search query. A context is a correlation between a plurality of concepts, thus the correlated metadata of the context (i.e., its concepts) can be utilized as the textual search query. In yet another embodiment, S640 includes searching a query database for a textual search query that matches one or more of the generated signatures. The query database maintains mappings of signatures to textual queries.

In an embodiment, the generated textual search query may be further optimized using any behavior and/or demographic information related to a user providing the input query at S610.

In S650, the generated textual search query is fed to at least one search engine 160 to search for information respective of the search query. Alternatively, as discussed above, the textual search query may be returned to a web browser submitting the query together with an embedded link to a search engine. In another embodiment, S650 includes searching the one or more information sources 150 using the signature(s). Such a search may be performed using the generated signature(s) and/or the generated textual search query. Alternatively or collectively, the search may be performed by the querying sever 130 using the generated textual search.

It should be noted that any of the techniques described in S650 can be utilized to search for appropriate results. That is, the search may be initiated by the search engine 160, the querying server 130 using signatures and/or textual queries, or by both the engine 160 and server 130.

Optionally, in S660, the search results are filtered to provide a set of results that would best serve the user providing the input query at S610. In an embodiment, the filtering of results may be performed based on the user's intent. The user's intent may be derived by the tracking user's experience or similar users' experiences by, for example, the web-browser.

Alternatively or collectively, the search results may be filtered by matching a multimedia element retrieved through the search of the textual search query to the input multimedia element. Such matching is performed by generating signature(s) for the retrieved multimedia element and matching such signature(s) to a signature of the input multimedia element. An exemplary matching process that can be utilized for this purpose is illustrated in FIG. 4.

The filtered search results can serve to detect web advertisements that would be of interest for the user. Matching web advertisements can be detected as described in the co-pending U.S. patent application Ser. No. 13/624,397 referenced above.

In S670, the filtered results are sent to the web browser (e.g. browser 120-1) for a display. In S680 it is checked whether an additional multimedia element is received as a search query, and if so, execution continues with S610; otherwise, execution terminates.

In an embodiment, the method discussed in FIG. 6 is performed by the query server 130. In another embodiment, the method can be adapted to allow the generation of textual queries by a computing device of the user.

Following is a non-limiting example for operation of the method described in FIG. 6. A touch gesture illustrating a smiley face over a satellite image of the East Coast is received by a user. The location of the user is determined as Manhattan in New York City based, for example on a global positioning system (GPS). By analyzing the gesture respective of the context of the image as well as the demographic information related to the user, the textual search query may be "entertainment in Manhattan."

As another example, the querying server 130 receives an on-image gesture illustrating a line over a satellite image of New York City starting at Manhattan and ending at Newark Airport. In order to determine the user's exact intent, a search box is created over the image and an indicator that the user's intent relates to travel options from Manhattan to Newark Airport by bus is received. Respective of the image signature and the user's intent, a textual search query is generated, for example, "Bus lines that travel from Manhattan to Newark Airport." The search results using the generated query are generated and displayed.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for searching a plurality of information sources using a multimedia content element, comprising:
   receiving an input search query including the multimedia content element and at least one on-image gesture detected thereon;
   analyzing the at least one on-image gesture to determine at least one portion of the multimedia content element in which a user is interested;
   generating at least one first signature for each of the at least one portion of the multimedia content element, wherein the at least one first signature is generated by a signature generator system including a plurality of at least partially statistically independent computational cores;
   generating a textual search query using the at least the one first signature, wherein generating the textual search query further comprises matching the at least one first signature to a plurality of second signatures, wherein the textual search query is generated based on text associated with at least one matching second signature;
   searching the plurality of information sources using the generated textual search query; and
   causing the display of search results retrieved from the plurality of information sources on a user device.

2. The method of claim 1, further comprising: creating an overlay on the at least one multimedia content element for receiving at least one search parameter representing an intent of the user, wherein the overlay is at least a search box.

3. The method of claim 2, further comprising: receiving at least one of demographic information and location information related to a user submitting the input search query; and optimizing the generated textual search query based on at least one of the demographic information, the location information, and the at least one search parameter.

4. The method of claim 1, wherein the on-image gesture is any one of: a touch gesture, a sketch gesture, a scroll over at least a portion of the multimedia content element, a clicks over the at least a portion of the multimedia content element, wherein the touch gesture is detected on a user device having a touch screen display.

5. The method of claim 4, wherein analyzing the at least on-image gesture further comprises: determining a type of the on-image gesture and a pattern of the on-image gesture with respect to the multimedia content element.

6. The method of claim 5, further comprising: clustering the at least one first signature; and searching the query database using the clustered signature.

7. The method of claim 1, wherein generating the textual search query further comprises: searching a query database for a textual search query that matches the at least one first signature, wherein the query database maintains mappings of the second signatures to text queries, and wherein a plurality of the second signatures are mapped to a single textual search query.

8. The method of claim 1, wherein generating the textual search query further comprises: matching the at least one first signature against a plurality of concept structures, and using a metadata of at least one matching concept structure as the textual search query; wherein each concept structure comprises signature reduced clusters and metadata related to the signature reduced clusters.

9. The method of claim 1, further comprising: determining a context of the multimedia content element respective of the at least one first signature; and determining the textual search query based on the determined context.

10. The method of claim 1, wherein causing the display of search results retrieved from the plurality of information further comprises: filtering the retrieved search results using the at least one first signature.

11. The method of claim 1, wherein the at least one multimedia content element is at least one of: an image, graphics, a video stream, a video clip, a video frame, a photograph, images of signals, and portions thereof.

12. A non-transitory computer readable medium having stored thereon instructions for causing one or more processing units to execute the method according to claim 1.

13. The method of claim 1, wherein the at least one first signature is in a format useable to query a database of stored concepts to detect at least one concept stored in the database that matches the at least one first signature, wherein a concept is a collection of signatures representing elements of unstructured data and metadata describing the concept.

14. The method according to claim 1 wherein the plurality of at least partially statistically independent computational cores comprise neural networks and wherein the at least one first signature for each of the at least one portion of the multimedia content element represents a response of at least some of the neural networks to the the at least one portion of the multimedia content.

15. The method according to claim 14 wherein the plurality of at least partially statistically independent computational cores are implemented in one or more integrated circuits.

16. A system for searching a plurality of information sources using a multimedia content element, comprising:
a processor; and
a memory coupled to the processor, the memory contains instructions that when executed by the processor cause the system to:
receive an input search query including the multimedia content element and at least one on-image gesture detected thereon;
analyze the at least on-image gesture to determine at least one portion of the multimedia content element in which a user is interested;
generate, by a signature generator, at least one first signature for each of the at least one portion of the multimedia content element, wherein the signature generator includes a plurality of at least partially statistically independent computational cores;
generate a textual search query using the at least the one signature, wherein generating the textual search query further comprises matching the at least one first signature to a plurality of second signatures, wherein the textual search query is generated based on text associated with at least one matching second signature;
search the plurality of information sources using the generated textual search query; and
cause the display of search results retrieved from the plurality of information sources on a user device.

17. The system of claim 16, wherein the signature generator is communicatively connected to the processor.

18. The system of claim 16, wherein the system is further configured to: create an overlay on the at least one multimedia content element for receiving at least one search parameter representing an intent of the user, wherein the overlay is at least a search box.

19. The system of claim 18, wherein the system is further configured to: receive at least one of demographic information and location information related to a user submitting the input search query; and optimize the generated textual search query based on at least one of the demographic information, the location information, and the at least one search parameter.

20. The system of claim 16, wherein the on-image gesture is any one of: a touch gesture, a sketch gesture, a scroll over at least a portion of the multimedia content element, a clicks over the at least a portion of the multimedia content element, wherein the touch gesture is detected on a user device having a touch screen display.

21. The system of claim 20, wherein the system is further configured to: determine a type of the on-image gesture and a pattern of the on-image gesture with respect to the multimedia content element.

22. The system of claim 21, wherein the system is further configured to: search a query database for a textual search query that matches the at least one first signature, wherein the query database maintains mappings of the second signatures to text queries, and wherein a plurality of second signatures are mapped to a single textual search query.

23. The system of claim 22, wherein the system is further configured to: cluster the at least one first signature; and search the query database using the clustered signature.

24. The system of claim 16, wherein the system is further configured to: match the at least one first signature against a plurality of structures, and use a metadata of at least one matching concept structure as the textual search query; wherein each concept structure comprises signature reduced clusters and metadata related to the signature reduced clusters.

25. The system of claim 16, wherein the system is further configured to: determine a context of the multimedia content element respective of the at least one first signature; and determine the textual search query based on the determined context.

26. The system of claim 16, wherein the multimedia content element is at least one of: an image, graphics, a video stream, a video clip, a video frame, a photograph, images of signals, and portions thereof.

27. The system of claim 16, wherein the at least one first signature is in a format useable to query a database of stored concepts to detect at least one concept stored in the database that matches the at least one first signature, wherein a concept is a collection of signatures representing elements of unstructured data and metadata describing the concept.

28. The system according to claim 16 wherein the plurality of at least partially statistically independent computational cores comprise neural networks and wherein the at least one first signature for each of the at least one portion of the multimedia content element represents a response of at least some of the neural networks to the the at least one portion of the multimedia content.

29. The system according to claim 28 wherein the plurality of at least partially statistically independent computational cores are implemented in one or more integrated circuits.

* * * * *